Patented Apr. 14, 1931

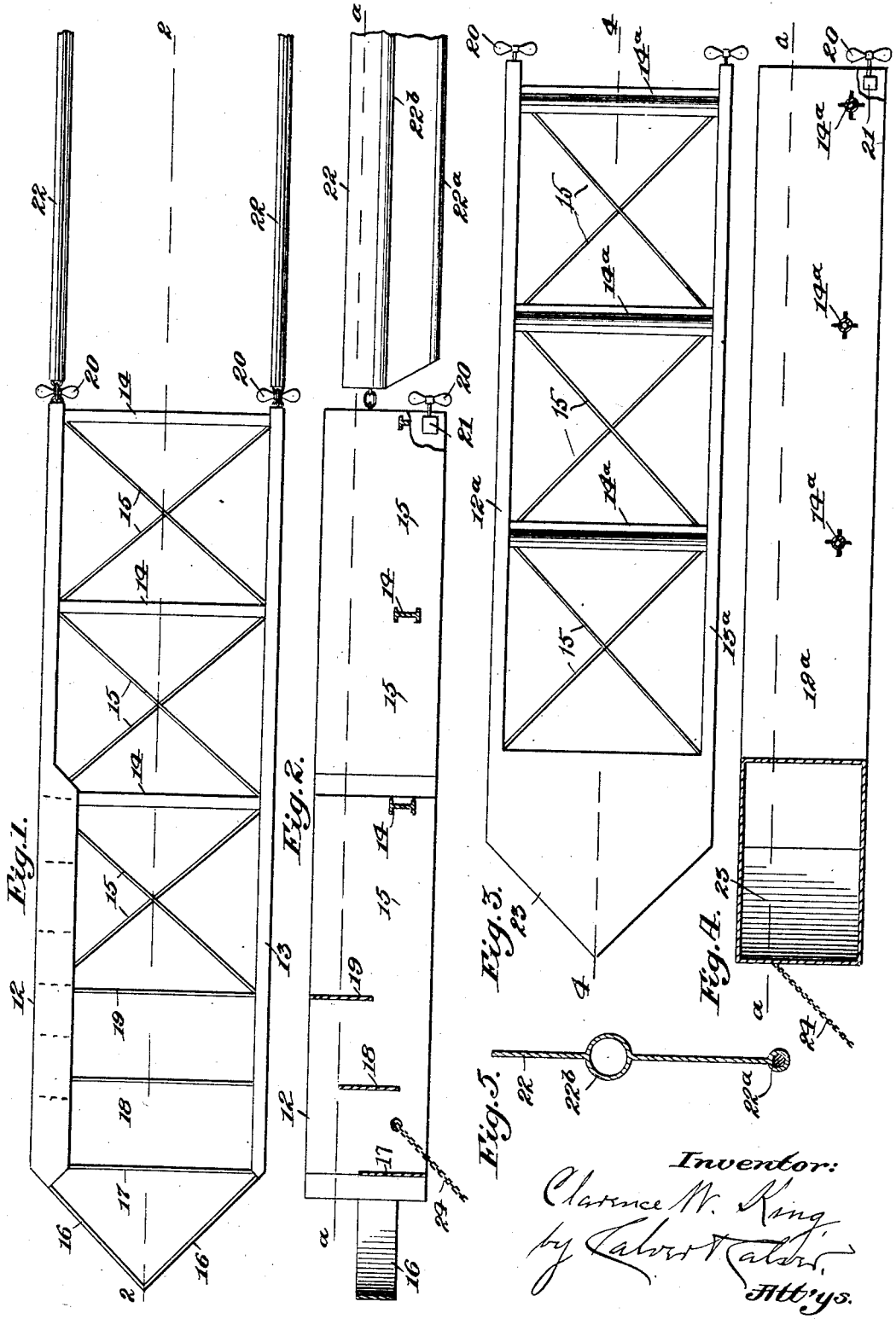

1,801,089

UNITED STATES PATENT OFFICE

CLARENCE W. KING, OF SHREVEPORT, LOUISIANA

FLOATING HARBOR

Application filed November 7, 1929. Serial No. 405,423.

This invention has for its object to provide a protected harbor for hydroplanes in rough water and may also be used as a protected harbor for small vessels of any kind; the invention being a variation of the invention set forth in my application Serial No. 370,579, filed June 13, 1929.

In accordance with the present invention, the sides of the harbor consist of two long floating units or hulls extending a suitable distance above and below the water line and joined together by transverse connections throughout most of their lengths. These hulls are joined together at their bow ends by a breakwater, as hereinafter more fully set forth.

In the accompanying drawing Fig. 1 is a plan view of a floating harbor constructed in accordance with the present invention, and Fig. 2 is a section thereof on line 2—2, Fig. 1. Fig. 3 is a plan view of a modified form of the construction shown in Fig. 1, and Fig. 4 is a section thereof on line 4—4, Fig. 3. Fig. 5 is a section of a floating plate.

Referring to Figs. 1 and 2, 12 and 13 denote two long rigid hulls joined together throughout most of their lengths, at some distance below the water line, by transverse bars 14 and also by diagonal bracing rods or bars 15. These hulls are joined together at their forward ends or bows by a breakwater construction consisting of plates 16, which form a pointed prow, which may be below the water line $a$, and also by plates 17, 18 and 19 having a stepped arrangement as shown in Fig. 2, the plate 17 being entirely below the water line and the plate 19 being only partly submerged and extending some distance above the water line. The hulls 12 and 13 will preferably be provided at their sterns with propellers 20 driven by electric motors 21, and by which the floating harbor may be navigated or may be held against heavy gales.

Rearward of the hulls 12 and 13 and attached thereto are a series of partly submerged floating plates 22, similar to those shown in my application above referred to, and having weighted parts $22^a$ and buoyant plates $22^b$. These plates are jointed together and extend below and above the water line $a$ and serve as a protected entrance to the floating harbor afforded by the hulls 12 and 13.

One or both of the floating hulls 12 and 13 will be sufficiently spacious to provide storage rooms for machinery and for supplies for hydroplanes or other vessels, and also to afford quarters for the crews of vessels seeking the protection of the harbor. To this end one or both of said hulls will be enlarged at its forward part, as shown at the top of Fig. 1.

In the modified construction shown in Figs. 3 and 4, the breakwater consists of a partly submerged hull 23 having a pointed prow and extending to a considerable distance above the water line, this breakwater being also sufficiently spacious to afford storage rooms for machinery and for supplies or for the accommodation of the crews of small vessels.

Extending rearward from the breakwater 23 are floating hull portions $12^a$ and $13^a$, these hulls being connected by cross bars of any suitable construction, these cross bars, as herein shown, being in the form of hollow cylinders $14^a$ with radiating plate stiffeners. These hulls $12^a$ and $13^a$ will also preferably be provided at their sterns with propellers 20 driven by motors 21, and by which the floating harbor may be navigated or may be held against heavy gales.

It will be understood, of course, that these floating harbors will be anchored in place in any suitable manner, as by means of cables 24.

Having thus described my invention, I claim and desire to secure by Letters Patent:—

1. A floating harbor, for hydroplanes or other vessels, comprising two long rigid hulls separated from each other to afford a harbor space between them, said hulls being rigidly connected together, a suitable distance below the water line, by cross bars and braces, and being also connected at their bows by a pointed breakwater, combined with a series of floating plates connected to the sterns of said hulls and affording a protected entrance to the harbor between said hulls.

2. A floating harbor, for hydroplanes or other vessels, comprising two long rigid hulls separated from each other to afford a harbor space between them, said hulls being rigidly connected together, a suitable distance below the water line, by cross bars and braces, and being also connected at their bows by a pointed breakwater, said breakwater consisting of a pointed prow and a stepped series of plates arranged at different levels.

3. A floating harbor, for hydroplanes or other vessels, comprising two long, rigid hulls separated from each other and having an open-topped harbor space between them, said hulls being rigidly connected together, a suitable distance below the water line, by cross bars and braces, and being also connected at their bows by a pointed breakwater, one or both of said hulls being enlarged at its forward part to afford storage room for supplies or living quarters for persons.

4. A floating harbor, for hydroplanes or other vessels, comprising two long rigid hulls separated from each other and having an open-topped harbor space between them, said hulls being rigidly connected together, a suitable distance below the water line, by cross bars and braces, and being also connected at their bows by a pointed breakwater, said hulls being provided at their sterns with motor-driven propellers, and one of said hulls being enlarged at its forward part to afford storage room for supplies or living quarters for persons.

In testimony whereof I affix my signature.

CLARENCE W. KING.